United States Patent
Wang et al.

(10) Patent No.: US 7,806,397 B2
(45) Date of Patent: Oct. 5, 2010

(54) SHEET-FEEDING SCANNING APPARATUS HAVING MECHANISM FOR FEEDING BUSINESS CARD

(75) Inventors: Chung-Kai Wang, Taipei (TW); Chao-Min Yang, Taipei (TW); Wen-An Huang, Taipei (TW); Wei-Hsun Hsu, Taipei (TW)

(73) Assignee: Primax Electronics Ltd., Taipei (TW)

( * ) Notice: Subject to any disclaimer, the term of this patent is extended or adjusted under 35 U.S.C. 154(b) by 149 days.

(21) Appl. No.: 12/197,862

(22) Filed: Aug. 25, 2008

(65) Prior Publication Data

US 2009/0315247 A1   Dec. 24, 2009

(30) Foreign Application Priority Data

Jun. 20, 2008   (TW) .............................. 97123121 A

(51) Int. Cl.
*B65H 5/26* (2006.01)
(52) U.S. Cl. .................... 271/9.09; 271/9.01; 271/9.13; 271/9.02; 399/392
(58) Field of Classification Search ................. 271/9.09; 399/392
See application file for complete search history.

(56) References Cited

U.S. PATENT DOCUMENTS

| | | | | |
|---|---|---|---|---|
| 4,204,668 A * | 5/1980 | Yanagawa | .................. | 271/9.02 |
| 5,290,021 A * | 3/1994 | Murooka et al. | ............ | 271/9.09 |
| 5,704,605 A * | 1/1998 | Yasuoka | ..................... | 271/9.02 |
| 5,738,453 A * | 4/1998 | Tsuburaya et al. | .......... | 400/624 |
| 6,267,368 B1 * | 7/2001 | Tomoe et al. | .............. | 271/9.09 |
| 6,612,561 B2 * | 9/2003 | Sekine | ....................... | 271/3.14 |
| 6,711,376 B2 * | 3/2004 | Suzuki et al. | ............... | 399/392 |
| 6,738,167 B1 * | 5/2004 | Suzuki | ....................... | 358/498 |
| 7,451,972 B2 * | 11/2008 | Fukada et al. | .............. | 271/9.09 |
| 7,668,501 B2 * | 2/2010 | Murakami et al. | .......... | 399/392 |

* cited by examiner

*Primary Examiner*—Saúl Rodríguez
*Assistant Examiner*—Luis Gonzalez
(74) *Attorney, Agent, or Firm*—Kirton & McConkie; Evan R. Witt

(57) ABSTRACT

The present invention relates to a sheet-feeding scanning apparatus having a business card feeding mechanism. The sheet-feeding scanning apparatus is adapted for scanning an image of an ordinary document or a business card. The sheet-feeding scanning apparatus includes a scanning module, an ordinary document input tray, an ordinary document pick-up roller assembly, an ejecting tray, a first channel, a second channel, a transfer roller assembly, a business card input tray and a business card pick-up roller assembly. The business card feeding mechanism can provide a relatively flat feeding and scanning channel for the business card such that the bending degree of the business card during transportation is reduced.

3 Claims, 5 Drawing Sheets

SHEET-FEEDING SCANNING APPARATUS HAVING MECHANISM FOR FEEDING BUSINESS CARD

FIELD OF THE INVENTION

The present invention relates to a sheet-feeding scanning apparatus, and more particularly to an automatic sheet-feeding scanning apparatus having a mechanism for feeding a business card or an ordinary document.

BACKGROUND OF THE INVENTION

With increasing development and growth of high technology industries, people often interchange business cards in many instances. Conventionally, the business cards are collected in a business card book. After the business cards are accumulated to a large amount, the basic information associated with the business cards is manually searched. This manual searching approach is very troublesome. In today's electronic and digitalized generation, the images of the business cards are scanned and the image data are immediately recognized or filed by associated software. In order to quickly search the basic information in the further, the basic information associated with the business cards are usually filed and sorted.

Generally, two types of scanning apparatuses, i.e. a sheet-feeding scanning apparatus and an exclusive business card scanner, are used to scan images of business cards. By using the sheet-feeding scanning apparatus, the business card is placed on a platform and then a scanning operation is performed. An example of the exclusive business card scanner is disclosed in for example in U.S. Pat. No. 5,604,640.

The sheet-feeding scanning apparatus or the exclusive business card scanner, however, can scan only a single business card at a time. Therefore, the process of using the sheet-feeding scanning apparatus or the exclusive business card scanner is troublesome and time-consuming.

Recently, an automatic document feeder is usually integrated into the scanning apparatus in order to successively scanning many documents at a time. The scanning apparatus having the automatic document feeder, however, can scan A4-sized or Letter-sized documents. In other words, the document having size similar to the business card fails to be transported by such a scanning apparatus.

Since A4-sized or Letter-sized documents are the most frequently used, the gap between the front and rear transfer roller assemblies of the automatic document feeder is designed to accommodate A4-sized or Letter-sized documents but. That is, these transfer roller assemblies cannot be used to transport the smaller-sized documents (e.g. the business cards).

SUMMARY OF THE INVENTION

It is an object of the present invention to provide an automatic sheet-feeding scanning apparatus having a mechanism for feeding a business card or an ordinary document.

Another object of the present invention provides an automatic sheet-feeding scanning apparatus having a business card feeding mechanism so as to reduce a bending degree of the business card during transportation.

In accordance with an aspect of the present invention, there is provided a sheet-feeding scanning apparatus having a business card feeding mechanism. The sheet-feeding scanning apparatus is adapted for scanning an image of an ordinary document or a business card. The sheet-feeding scanning apparatus includes a scanning module, an ordinary document input tray, an ordinary document pick-up roller assembly, an ejecting tray, a first channel, a second channel, a transfer roller assembly, a business card input tray and a business card pick-up roller assembly. The scanning module is disposed within a scan region for scanning the image of the ordinary document or the business card. The ordinary document input tray is arranged on one side of the scanning module for placing the ordinary document thereon. The ordinary document pick-up roller assembly is used for feeding the ordinary document on the ordinary document input tray into the internal portion of the sheet-feeding scanning apparatus. The ejecting tray is disposed below the ordinary document input tray for supporting the ordinary document or the business card after being scanned. The first channel is arranged between the ordinary document input tray and the scan region for leading the ordinary document to the scan region. The second channel is arranged between the scan region and the ejecting tray for leading the ordinary document to the ejecting tray. The transfer roller assembly is arranged in the first channel, and includes a transfer roller and a pressing roller for transporting the ordinary document in the first channel. A nip point is defined between the transfer roller and the pressing roller. The business card input tray is arranged on another side of the scanning module for placing the business card thereon. The business card pick-up roller assembly is used for feeding the business card on the business card input tray into the first channel. The transfer roller assembly is disposed adjacent to the business card input tray. The business card is fed into the first channel through the nip point between the transfer roller and the pressing roller. The nip point is located below a horizontal line passing through a center of the transfer roller.

In an embodiment, the business card pick-up roller assembly comprises a shaft rod and a business card pick-up roller module.

In an embodiment, the business card input tray is pivotally coupled to the shaft rod such that the business card input tray is rotated in either a feeding position or a retracting position with respect to the shaft rod.

In an embodiment, the sheet-feeding scanning apparatus further comprises a sensing device and a power-switching device. The sensing device detects the position of the business card input tray. The power-switching device for driving the ordinary document pick-up roller assembly or the business card pick-up roller assembly. When the business card input tray is located in the retracting position, the business card pick-up roller assembly is driven by the power-switching device. When the business card input tray is located in the feeding position, the ordinary document pick-up roller assembly is driven by the power-switching device.

In an embodiment, the power-switching device comprises a rolling wheel having two notches and a rotatable fastening arm.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Figure 1:
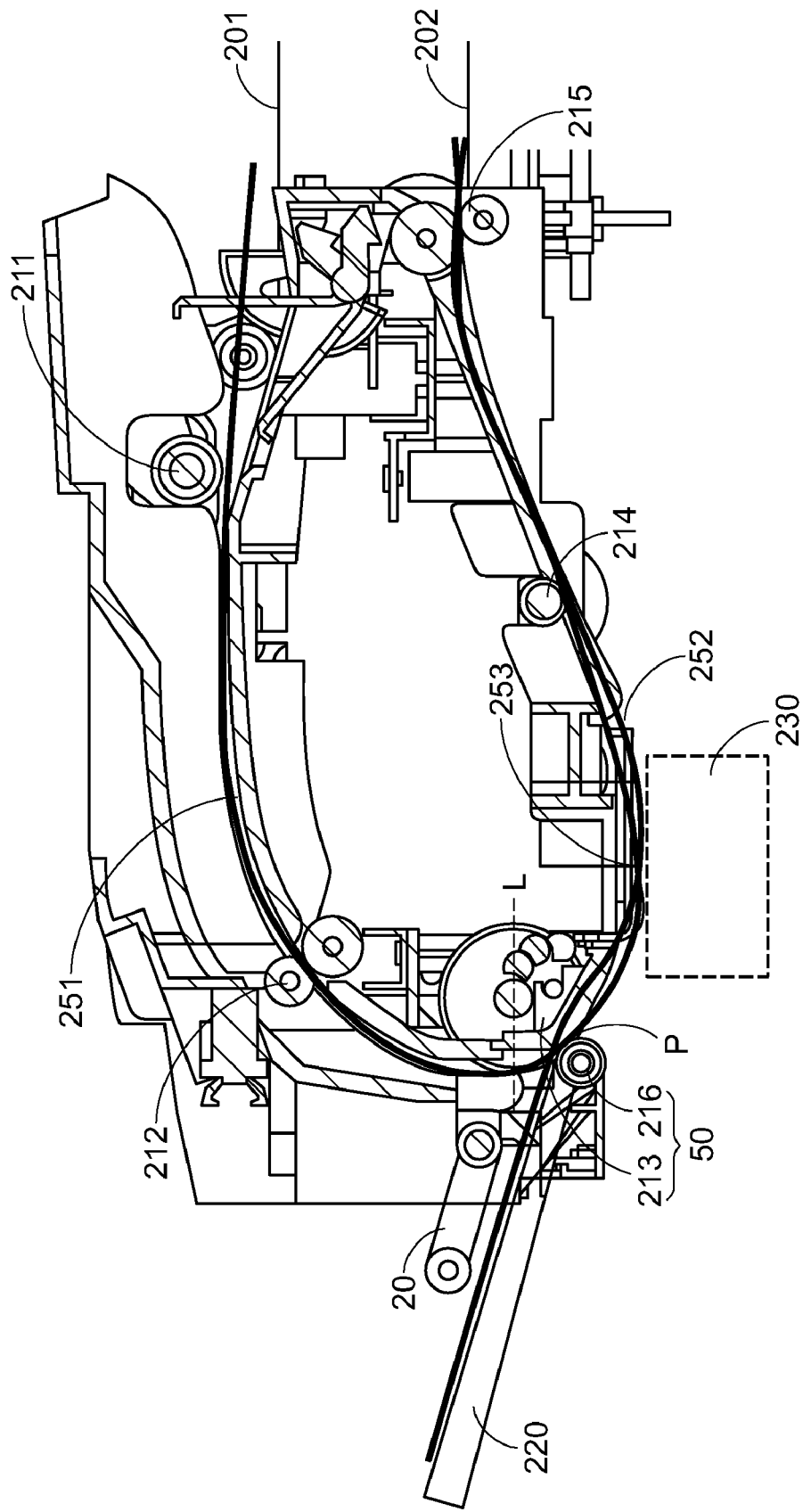
FIG. 1 is a schematic view illustrating a scanning path of a scanning apparatus according to a preferred embodiment of the present invention.
Figure 2:
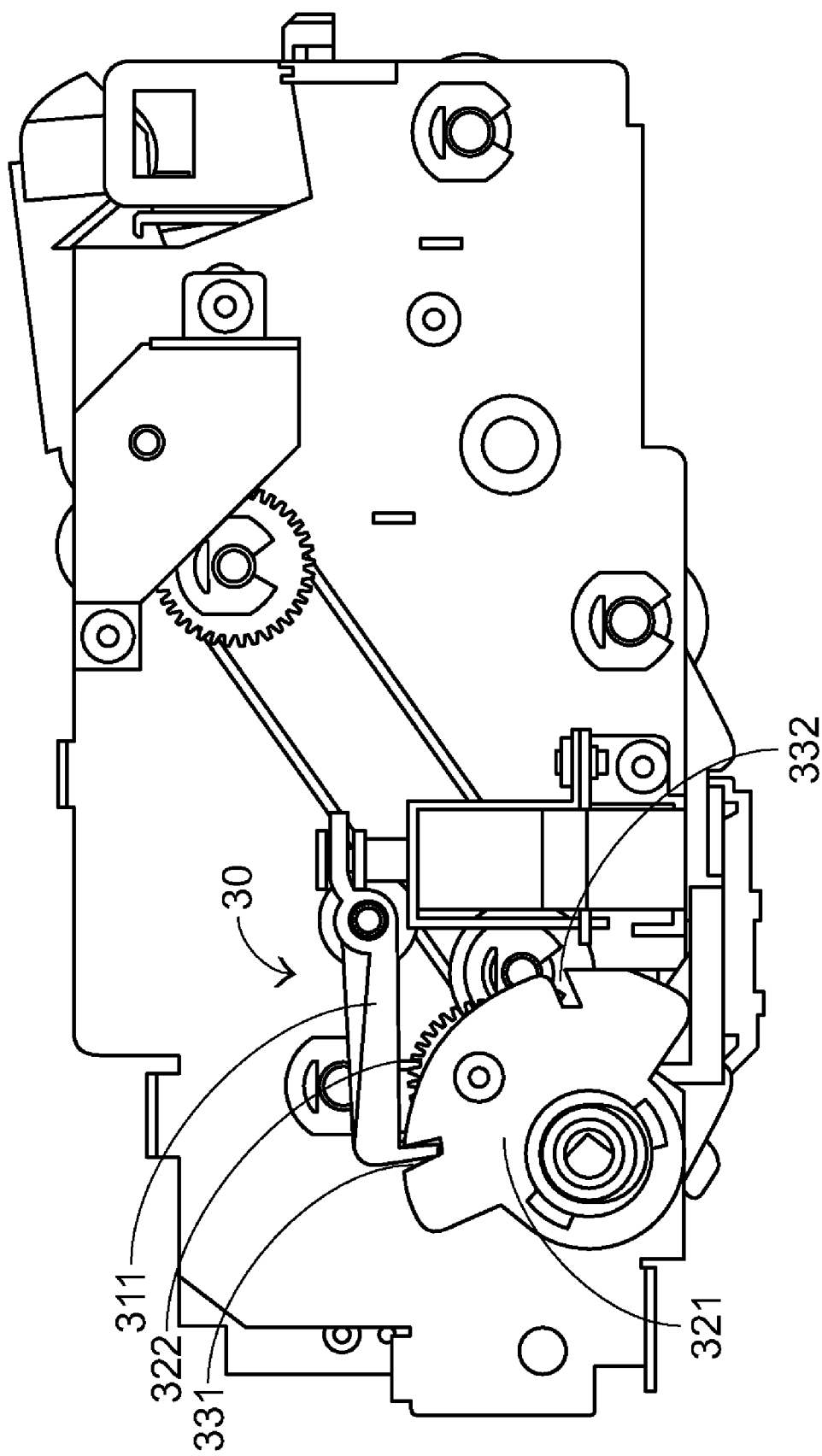
FIG. 2 is a schematic view illustrating that a power-switching device of the scanning apparatus provides power to an ordinary document pick-up roller assembly for feeding the ordinary document.

Please refer to FIGS. 1 and 2. FIG. 1 is a schematic view illustrating a scanning path of a scanning apparatus according to a preferred embodiment of the present invention. FIG. 2 is a schematic view illustrating that a power-switching device 30 of the scanning apparatus provides power to an ordinary document pick-up roller assembly 211 for feeding the ordinary document. The scanning apparatus of the present invention has an automatic feeding mechanism for feeding a business card or an ordinary document. The power-switching device 30 comprises a rolling wheel 321 and a fastening arm 311. The rolling wheel 321 has a first notch 331 and a second notch 332. For scanning the ordinary document, the fastening arm 311 is fixed in the first notch 331 of the rolling wheel 321 such that the ordinary document pick-up roller assembly 211 acquires the power to transport the ordinary document.

Figure 5:
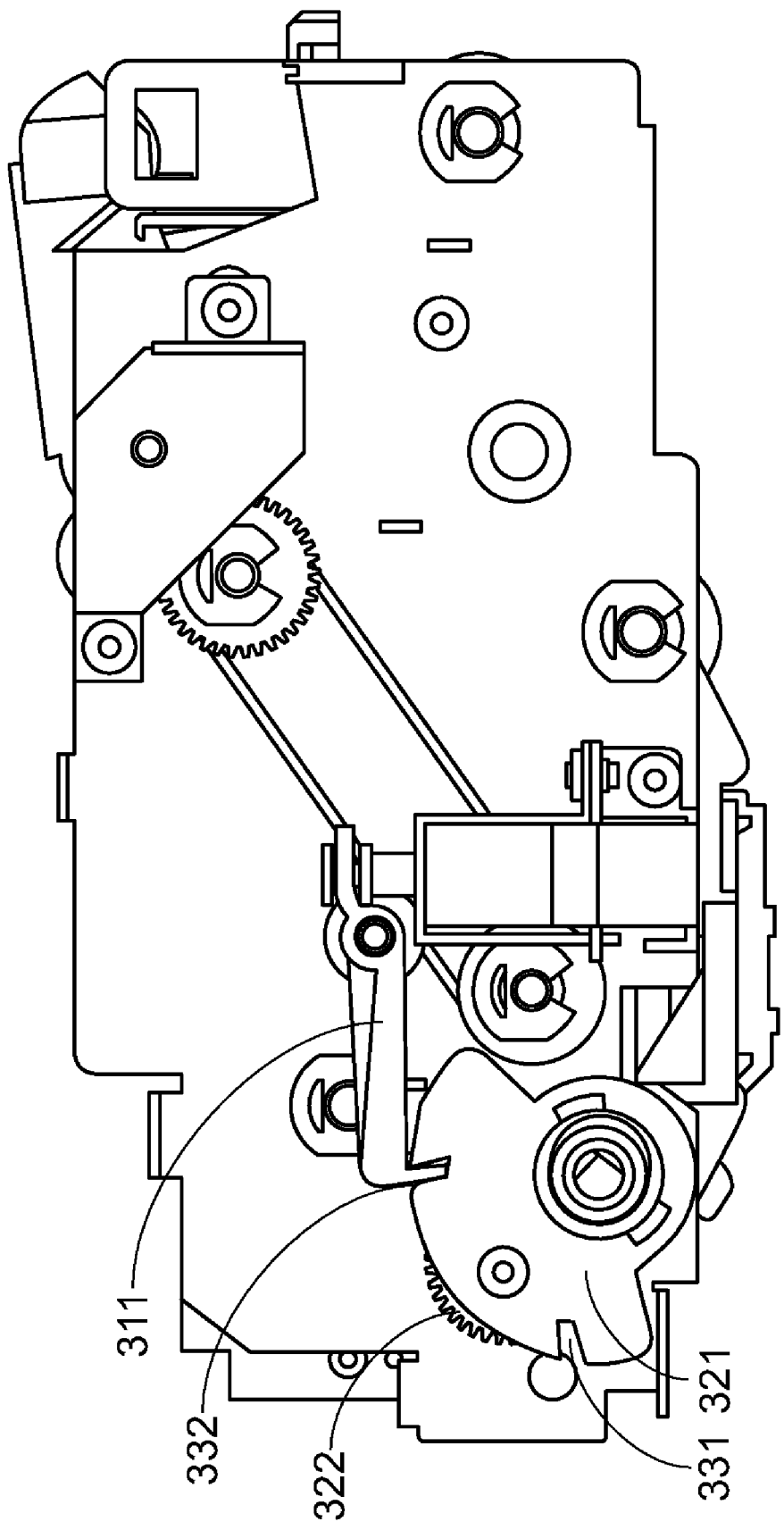
FIG. 5 is a schematic view illustrating that the power-switching device of the scanning apparatus provides power to the business card pick-up roller assembly for feeding the business card.

FIG. 5 is a schematic illustrating the power-switching device 30 used in the scanning apparatus of the present invention for providing power to a business card pick-up roller module 20 of a business card pick-up roller assembly 200. For scanning the business card, the fastening arm 311 is fixed in the second notch 332 of the rolling wheel 321 such that the business card pick-up roller module 20 acquires the power to transport the business card.

Figure 3:
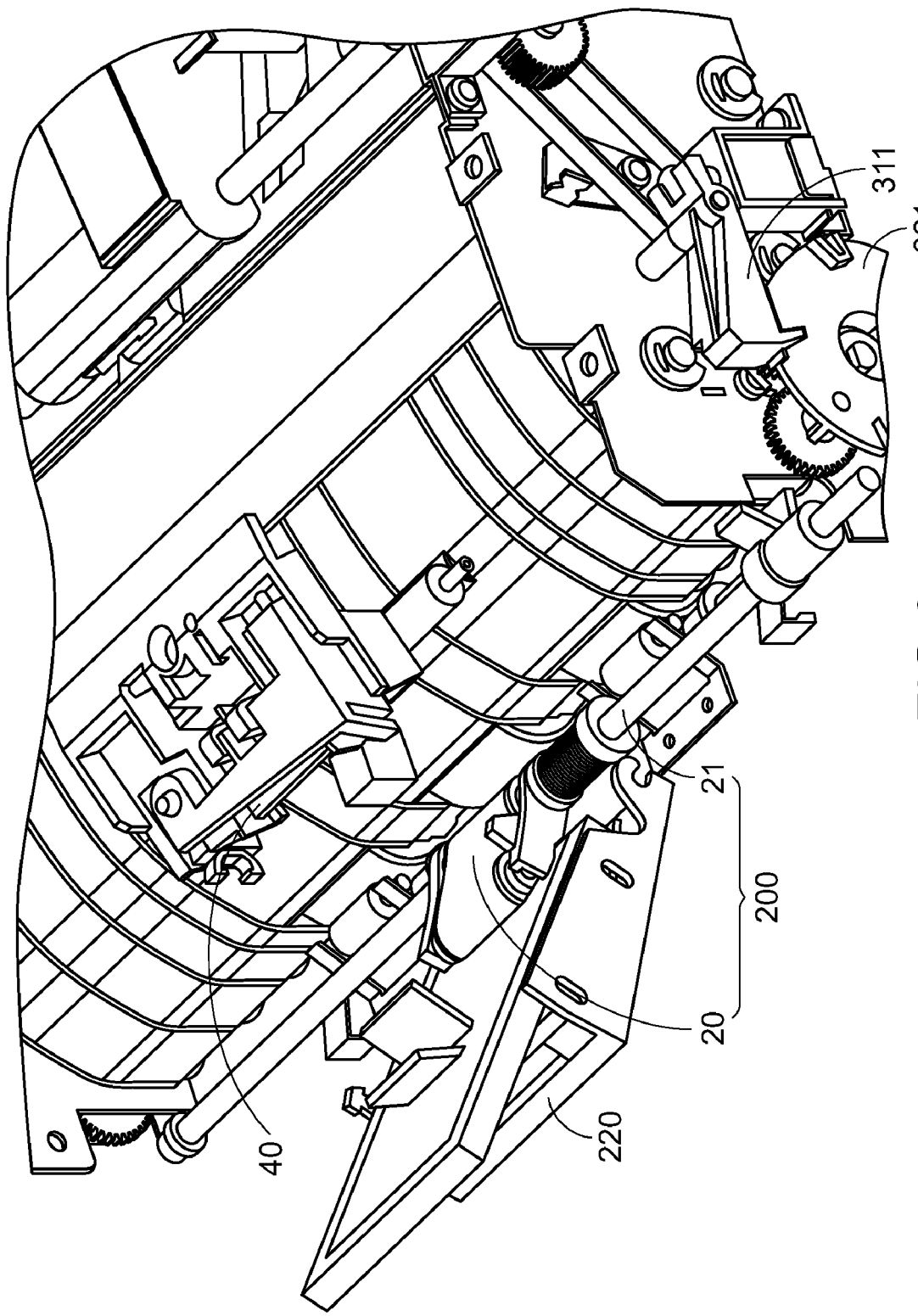
FIG. 3 schematically illustrates a business card input tray and a sensing device of the scanning apparatus of the present invention.

In an embodiment, the position of the fastening arm 311 is adjusted by changing the position of a business card input tray 220. FIG. 3 schematically illustrates a sensing device 40 for detecting the position of the business card input tray 220. As shown in FIG. 3, the business card pick-up roller assembly 200 comprises a shaft rod 21 and the business card pick-up roller module 20. The business card input tray 220 is pivotally coupled to the shaft rod 21 so as to be rotated in either a feeding position or a retracting position with respect to the shaft rod 21. For scanning the ordinary document, the user may rotate the business card input tray 220 in the direction close to the sensing device 40 such that the business card input tray 220 is located in the retracting position. When the sensing device 40 detects the presence of the business card input tray 220 in the retracting position, the fastening arm 311 is fixed in the first notch 331 of the rolling wheel 321 such that the ordinary document pick-up roller assembly 211 acquires the power to feed the ordinary document into the automatic feeding mechanism. Whereas, for scanning the business card, the business card input tray 220 may be rotated in the direction away from the sensing device 40 such that the business card input tray 220 is located in the feeding position. When the sensing device 40 detects the presence of the business card input tray 220 in the feeding position, the fastening arm 311 is fixed in the second notch 332 of the rolling wheel 321 such that the business card pick-up roller assembly 200 acquires the power to transport the business card.

Hereinafter, the process of scanning an ordinary document by using the scanning apparatus of the present invention will be illustrated with reference to FIGS. 1 and 2. For a purpose of scanning an ordinary document, the business card input tray 220 is rotated to the retracting position and then the fastening arm 311 is fixed in the first notch 331 of the rolling wheel 321. Under this circumstance, the ordinary document pick-up roller assembly 211 acquires the power to transport the ordinary document. After the ordinary document is placed on an ordinary document input tray 201, the ordinary document is fed into a first channel 251 of the automatic feeding mechanism by the ordinary document pick-up roller assembly 211. Next, the ordinary document is transported to a scan region 253 through a first intermediate roller assembly 212 and a transfer roller 213 and a pressing roller 216 of a transfer roller assembly 50. After the ordinary document is transported across the scan region 253, a scanning module 230 located within the scan region 253 will scan the image of the ordinary document. Until the scanning operation of the scanning module 230 is completed, the ordinary document is transported into a second channel 252. Next, the ordinary document is transported to an ejecting tray 202 by a second intermediate roller assembly 214 and an ejecting roller assembly 215.

Figure 4:
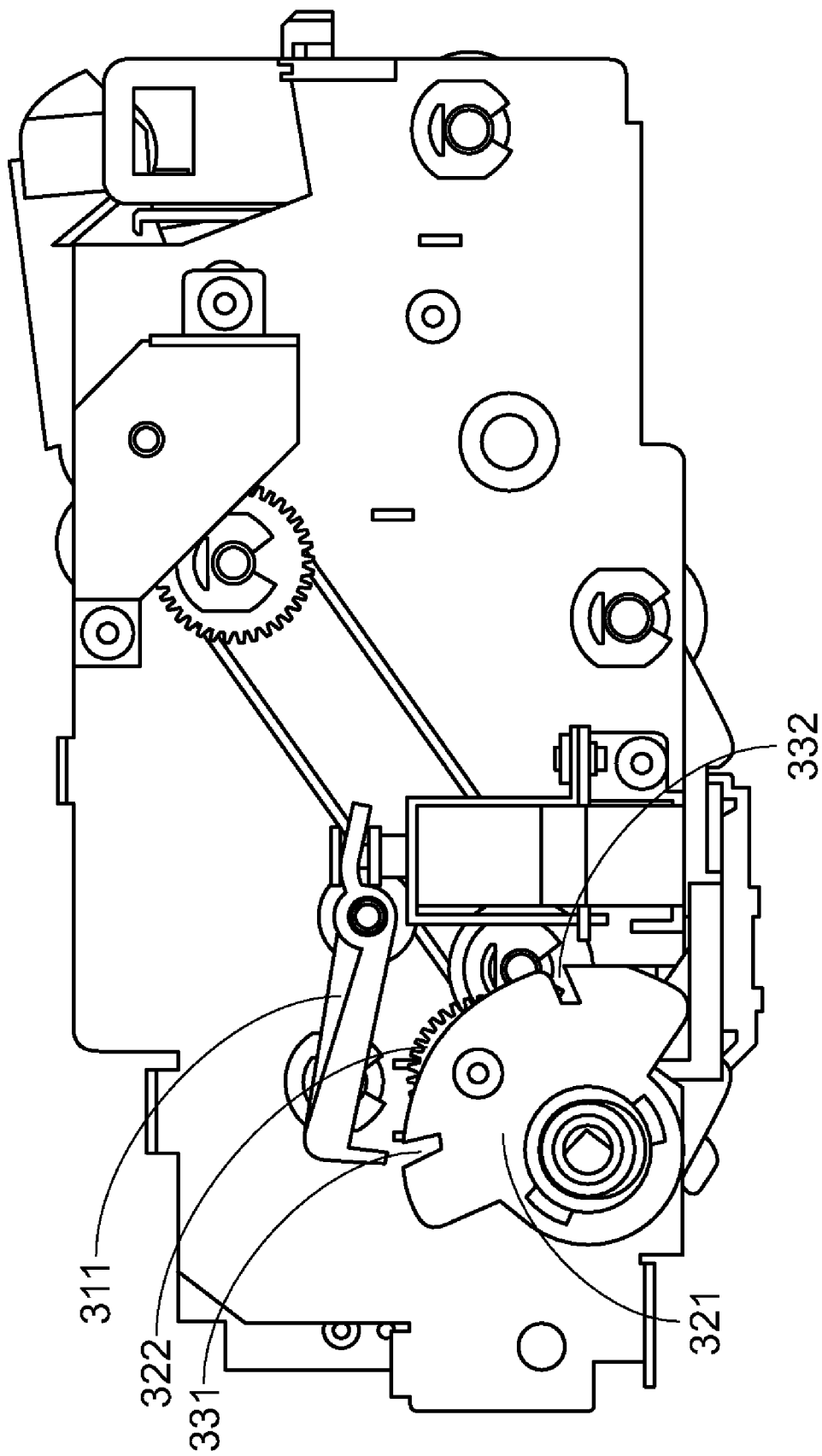
FIG. 4 is a schematic view illustrating that the power-switching device of the scanning apparatus is being switched from a position to another position.

Hereinafter, the process of scanning a business card by using the scanning apparatus of the present invention will be illustrated with reference to FIGS. 4 and 5. For a purpose of scanning a business card, the business card input tray 220 is rotated to the feeding position. When the sensing device 40 detects the presence of the business card input tray 220 in the feeding position, the fastening arm 311 is uplifted, as is shown in FIG. 4. Next, the fastening arm 311 is detached from the first notch 331 of the rolling wheel 321 and disposed adjacent to the periphery of the rolling wheel 321. Next, the rolling wheel 321 is driven by a motor (not shown) to rotate in an anti-clockwise direction such that the second notch 332 is moved toward the fastening arm 311. Next, the fastening arm 311 is fixed in the second notch 332 of the rolling wheel 321, as is shown in FIG. 5. Upon rotation of the rolling wheel 321, a gear 322 fixed on the rolling wheel 321 is disconnected from the ordinary document pick-up roller assembly 211. Consequently, the ordinary document pick-up roller assembly 211 for the ordinary document input tray 201 losses the power of feeding the ordinary document. On the other hand, the gear 322 fixed on the rolling wheel 321 is linked to the business card pick-up roller assembly 200 such that the business card pick-up roller assembly 200 acquires the power to transport the business card. Since the ordinary document pick-up roller assembly 211 loses the power, the ordinary document on the ordinary document input tray 201 fails to be fed into the automatic feeding mechanism by the ordinary document pick-up roller assembly 211.

Please refer to FIG. 1 again. The business card on the business card input tray 220 is fed into the first channel 251 by the business card pick-up roller module 20. When the business card enters the first channel 251 and the initial contact point between the business card and the transfer roller 213 is below a horizontal line L passing through the center of the transfer roller 213, the business card is nipped between the transfer roller 213 and the pressing roller 216 and thus transported to the scan region 253. Subsequently, the ordinary document is transported to the ejecting tray 202 by the second intermediate roller assembly 214 and the ejecting roller assembly 215.

In accordance with a key feature of the present invention, the nip point between the transfer roller 213 and the pressing roller 216 is below the horizontal line L passing through the center of the transfer roller 213. Due to this specified design, the curvature of the path from the business card pick-up roller module 20 to the first channel 251 is decreased. As a result, the bending degree of the business card during the business card is transported into the first channel 251 is reduced.

From the above description, the automatic document feeder of the sheet-feeding scanning apparatus of the present invention has a mechanism for feeding business cards or ordinary documents. Since many business cards or ordinary documents can be fed into the automatic document feeder at a time, the scanning speed is enhanced. The function of feeding the ordinary document or the business card is selectively implemented by changing the position of the business card input tray so that the operation of the sheet-feeding scanning apparatus of the present invention is very convenient. Moreover, due to the specified designs of the business card input tray and the rolling wheel, the bending degree of the business card during transportation is reduced.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A sheet-feeding scanning apparatus having a business card feeding mechanism, said sheet-feeding scanning apparatus being adapted for scanning an image of an ordinary document or a business card, and comprising:

a scanning module disposed within a scan region for scanning said image of said ordinary document or said business card;

an ordinary document input tray arranged on one side of said scanning module for placing said ordinary document thereon;

an ordinary document pick-up roller assembly for feeding said ordinary document on said ordinary document input tray into the internal portion of said sheet-feeding scanning apparatus;

an ejecting tray disposed below said ordinary document input tray for supporting said ordinary document or said business card after being scanned;

a first channel arranged between said ordinary document input tray and said scan region for leading said ordinary document to said scan region;

a second channel arranged between said scan region and said ejecting tray for leading said ordinary document to said ejecting tray;

a transfer roller assembly arranged in said first channel, and comprising a transfer roller and a pressing roller for transporting said ordinary document in said first channel, wherein a nip point is defined between said transfer roller and said pressing roller;

a business card input tray arranged on another side of said scanning module for placing said business card thereon;

a business card pick-up roller assembly for feeding said business card on said business card input tray into said first channel;

a sensing device for detecting the position of said business card input tray; and a power-switching device for driving said ordinary document pick-up roller assembly or said business card pick-up roller assembly, wherein said power-switching device comprises a rolling wheel having two notches and a rotatable fastening arm, wherein said business card pick-up roller assembly is driven by said power-switching device when said business card input tray is located in a feeding position, and said ordinary document pick-up roller assembly is driven by said power-switching device when said business card input tray is located in a retracting position, wherein said transfer roller assembly is disposed adjacent to said business card input tray, said business card is fed into said first channel through said nip point between said transfer roller and said pressing roller, and said nip point is located below a horizontal line passing through a center of said transfer roller.

2. The sheet-feeding scanning apparatus having a business card feeding mechanism according to claim 1 wherein said business card pick-up roller assembly comprises a shaft rod and a business card pick-up roller module.

3. The sheet-feeding scanning apparatus having a business card feeding mechanism according to claim 2 wherein said business card input tray is pivotally coupled to said shaft rod such that said business card input tray is rotated in either said feeding position or said retracting position with respect to said shaft rod.

* * * * *